United States Patent
Nishikawa et al.

(10) Patent No.: US 9,018,901 B2
(45) Date of Patent: Apr. 28, 2015

(54) ELECTRICAL POWER RECEIVING APPARATUS AND ELECTRICAL POWER RECEIVING METHOD

(75) Inventors: Takayuki Nishikawa, Kanagawa (JP); Kazuma Takeuchi, Kanagawa (JP); Satoshi Senga, Osaka (JP); Hirokazu Kobayashi, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 311 days.

(21) Appl. No.: 13/816,783

(22) PCT Filed: Feb. 23, 2012

(86) PCT No.: PCT/JP2012/001246
§ 371 (c)(1),
(2), (4) Date: Feb. 13, 2013

(87) PCT Pub. No.: WO2012/120809
PCT Pub. Date: Sep. 13, 2012

(65) Prior Publication Data
US 2013/0141039 A1    Jun. 6, 2013

(30) Foreign Application Priority Data
Mar. 8, 2011    (JP) .................. 2011-050582

(51) Int. Cl.
H02J 7/00    (2006.01)
H04B 5/00    (2006.01)
H01M 10/44    (2006.01)
H01M 10/48    (2006.01)
H02J 5/00    (2006.01)

(52) U.S. Cl.
CPC ............ *H02J 7/0052* (2013.01); *H04B 5/0037* (2013.01); *H01M 10/44* (2013.01); *H01M 10/48* (2013.01); *H02J 5/005* (2013.01)

(58) Field of Classification Search
CPC ........... H02J 7/025; H02J 5/005; H02J 17/00; H02J 7/0068; H02J 7/0013; H02J 7/0052; B60L 11/182; H04B 5/0037; H01M 10/44; H01M 10/48
USPC .................................. 320/108, 117, 121, 128
See application file for complete search history.

(56) References Cited

U.S. PATENT DOCUMENTS

2008/0058029 A1    3/2008   Sato et al.
2009/0284082 A1*   11/2009  Mohammadian ............. 307/104
(Continued)

FOREIGN PATENT DOCUMENTS

CN    101136561 A    3/2008
JP    2002-208495 A  7/2002
(Continued)

OTHER PUBLICATIONS
International Search Report for PCT/JP2012/001246 dated May 22, 2012.

*Primary Examiner* — Nha Nguyen
(74) *Attorney, Agent, or Firm* — Pearne & Gordon LLP (57) ABSTRACT

This electrical power-receiving apparatus makes it possible to suppress a decline in power supply efficiency in a variety of different circumstances while avoiding an increase in circuit scale. This apparatus comprises an impedance control unit (307) for sequentially switching through any one of a plurality of charging devices in a charging device group (310), as candidate charging devices for a supply destination to which electrical power is to be supplied. The impedance control unit (307) also selects from the candidates a charging device to which electrical power is actually supplied, on the basis of the difference between the impedance of the charging device group (310) for each candidate and the impedance of an electrical power receiving antenna unit (301), and causes electrical power to be supplied to the selected charging device.

8 Claims, 7 Drawing Sheets

(56) References Cited

U.S. PATENT DOCUMENTS

2012/0104998 A1    5/2012   Takada et al.
2012/0146425 A1*   6/2012   Lee et al. .................... 307/104

FOREIGN PATENT DOCUMENTS

| | | |
|---|---|---|
| JP | 2008-086196 A | 4/2008 |
| JP | 2010-141977 A | 6/2010 |
| JP | 2010-183810 A | 8/2010 |

* cited by examiner

| CANDIDATE | DIFFERENCE |
|---|---|
| CHARGING APPARATUS 311 | $\Delta Z_1$ |
| CHARGING APPARATUS 312 | $\Delta Z_2 (> \Delta Z_1)$ |
| CHARGING APPARATUS 312 | $\Delta Z_3 (> \Delta Z_2)$ |

FIG. 3A

| CANDIDATE | |
|---|---|
| CHARGING APPARATUS 311 | SELECTED |
| CHARGING APPARATUS 312 | UNSELECTED |
| CHARGING APPARATUS 313 | UNSELECTED |

FIG. 3B

| CANDIDATE | IMPEDANCE |
|---|---|
| CHARGING APPARATUS 311 | $Z_1$ |
| CHARGING APPARATUS 312 | $Z_2$ |
| CHARGING APPARATUS 313 | $Z_3$ |

| CANDIDATE | |
|---|---|
| CHARGING APPARATUSES 311, 312 | SELECTED |
| CHARGING APPARATUSES 311, 313 | UNSELECTED |
| CHARGING APPARATUSES 312, 313 | UNSELECTED |
| CHARGING APPARATUSES, 311, 312, 313 | UNSELECTED |

FIG. 7A

| CANDIDATE | IMPEDANCE |
|---|---|
| CHARGING APPARATUSES 311, 312 | $Z_1$ |
| CHARGING APPARATUSES 311, 313 | $Z_2$ |
| CHARGING APPARATUSES 312, 313 | $Z_3$ |
| CHARGING APPARATUSES, 311, 312, 313 | $Z_4$ |

FIG. 7B

| CANDIDATE | DIFFERENCE |
|---|---|
| CHARGING APPARATUSES 311, 312 | $\Delta Z_1$ |
| CHARGING APPARATUSES 311, 313 | $\Delta Z_2 (> \Delta Z_1)$ |
| CHARGING APPARATUSES 312, 313 | $\Delta Z_3 (> \Delta Z_2)$ |
| CHARGING APPARATUSES, 311, 312, 313 | $\Delta Z_4 (> \Delta Z_3)$ |

FIG. 7C

ELECTRICAL POWER RECEIVING APPARATUS AND ELECTRICAL POWER RECEIVING METHOD

TECHNICAL FIELD

The claimed invention relates to an electrical power receiving apparatus and an electrical power receiving method in a non-contact electrical power transmission system which transmits electrical power from an electrical power transmission apparatus to an electrical power receiving apparatus using electromagnetic resonance.

BACKGROUND ART

In recent years, a non-contact electrical power transmission system which transmits electrical power in a wireless manner without connecting the apparatuses by means of a cable has been developed. In the non-contact electrical power transmission system, electrical power supply efficiency changes depending on the distance between the electrical power transmission apparatus and the electrical power receiving apparatus in the non-contact electrical power transmission system or the surrounding environment. For this reason, in the non-contact electrical power transmission system, it is important to achieve high electrical power supply efficiency in any usage environment.

One of the contributing factors in a decline in electrical power supply efficiency is, for example, impedance mismatching between the electrical power transmission and receiving apparatuses in the non-contact electrical power transmission system. Impedance mismatching occurs due to changes in impedance of the antennas of the electrical power transmission and receiving apparatuses with the change in the distance between the electrical power transmission and receiving apparatuses or the surrounding environment when using the non-contact electrical power transmission system. Additionally, impedance matching between a power source apparatus generating electrical power in the electrical power transmission apparatus and a load part using electrical power in the electrical power receiving apparatus is not obtained. As a result, the electrical power is reflected, and the electrical power supply efficiency is declined.

As the related art for solving this problem, for example, Patent Literature (hereinafter, abbreviated to as PTL) 1 discloses a non-contact electrical power transmission apparatus which has an impedance variable circuit. In PTL 1, an electrical power transmission apparatus includes an A/C power source and an electrical power transmission antenna, and an electrical power receiving apparatus includes an electrical power receiving antenna, a load, and an impedance variable circuit. The impedance variable circuit adjusts impedance to suppress changes in impedance of a resonant system constituted by the electrical power transmission antenna, the electrical power receiving antenna, and the load. Accordingly, the technique of PTL 1 obtains impedance matching between the A/C power source and the resonant system, and maintains electrical power supply efficiency.

CITATION LIST

Patent Literature

PTL 1
Japanese Patent Application Laid-Open No. 2010-141977

SUMMARY OF INVENTION

Technical Problem

However, according to the technique of PTL impedance adjustment of the impedance variable circuit is performed with reference to a data map or relational expression of control parameters stored in advance in the apparatus. The data map or relational expression of control parameters is prepared for each inter-antenna distance or each load state assumed in advance. Accordingly, according to the technique of PTL 1, in a circumstance which is not assumed in advance by a designer, for example, when an interceptor is sandwiched between the electrical power transmission and receiving apparatuses to change space magnetic permeability, it becomes difficult to obtain impedance matching. For this reason, the technique of PTL 1 has a problem that, in the circumstance which is not assumed in advance by the designer, electrical power supply efficiency may be declined. The technique of PTL 1 also has a problem that circuit scale increases by providing the impedance variable circuit.

An object of the claimed invention is to provide an electrical power receiving apparatus and an electrical power receiving method capable of suppressing a decline in electrical power supply efficiency under various circumstances while suppressing an increase in circuit scale.

Solution to Problem

An electrical power receiving apparatus of the claimed invention includes an electrical power receiving antenna section that receives electrical power, a first impedance measurement section that measures impedance of the electrical power receiving antenna section, a charging apparatus group that has a plurality of charging apparatuses and charges the electrical power, a second impedance measurement section that measures impedance of the charging apparatus group, and a control section that sequentially switches at least one of the plurality of charging apparatuses as candidates for the charging apparatuses as a supply destination to which the electrical power will be supplied, selects the charging apparatus, to which the electrical power will be actually supplied, from the candidates on the basis of the difference between impedance of the charging apparatus group for each candidate and impedance of the electrical power receiving antenna section, and causes the electrical power to be supplied to the selected charging apparatus.

An electrical power receiving method of the claimed invention includes the steps of receiving electrical power, measuring impedance of an electrical power receiving antenna section that receives the electrical power, measuring impedance of a charging apparatus group that has a plurality of charging apparatuses and charges the electrical power, sequentially switching at least one of the plurality of charging apparatuses as candidates for the charging apparatuses as a supply destination to which the electrical power will be supplied, selecting the charging apparatus, to which the electrical power will be actually supplied, from the candidates on the basis of the difference between impedance of the charging apparatus group for each candidate and impedance of the electrical power receiving antenna section, and causing the electrical power to be supplied to the selected charging apparatus.

Advantageous Effects of Invention

According to the claimed invention, it is possible to suppress a decline in electrical power supply efficiency in various circumstances while suppressing an increase in circuit scale.

DESCRIPTION OF EMBODIMENTS

Hereinafter, embodiments of the claimed invention will be described in detail with reference to the drawings.

(Embodiment 1)

Figure 1:
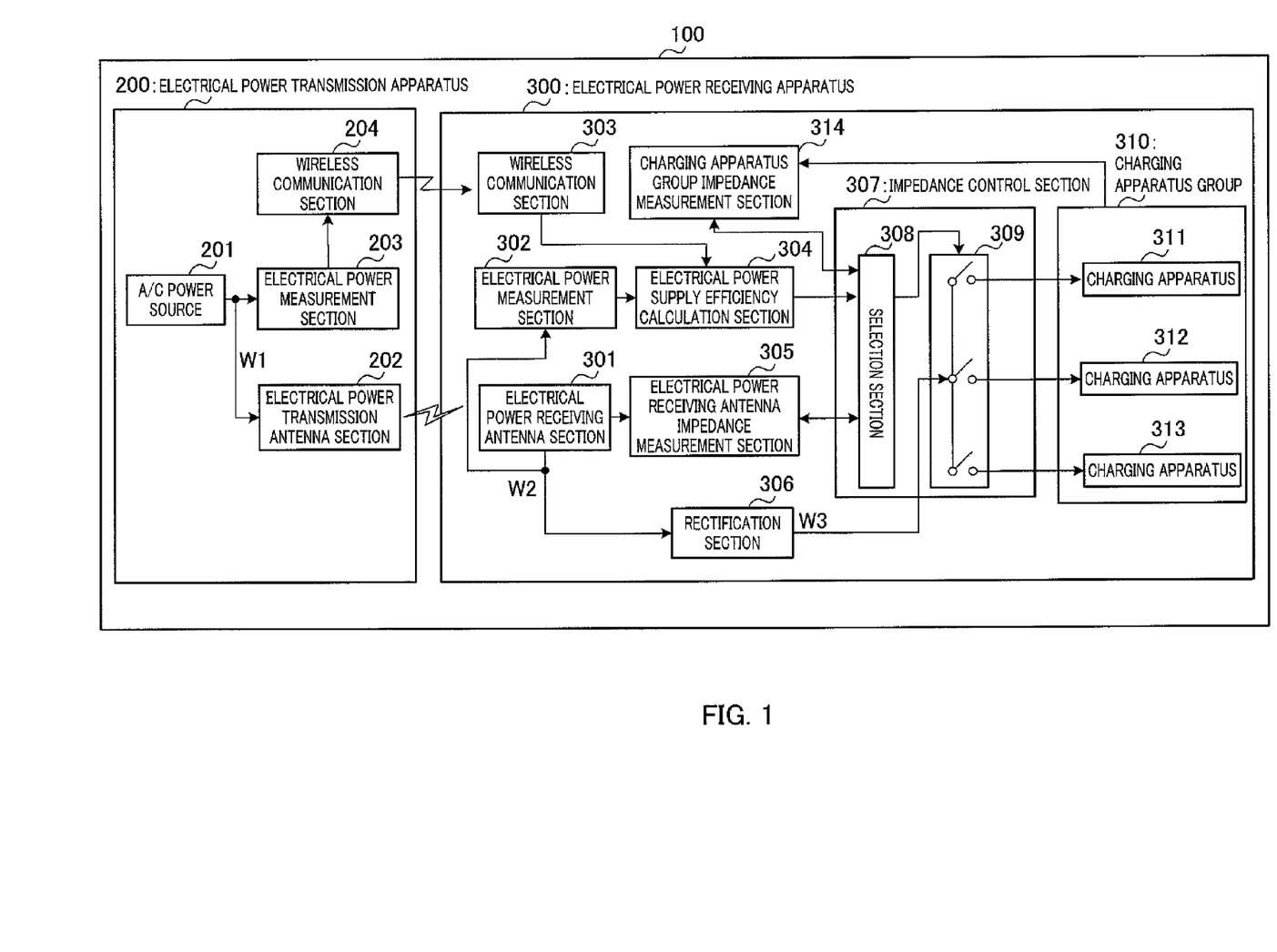
FIG. 1 is a diagram showing the configuration of a non-contact electrical power transmission system according to Embodiment 1 of the claimed invention.

FIG. 1 shows the configuration of a non-contact electrical power transmission system according to Embodiment 1 of the claimed invention. Non-contact electrical power transmission system 100 of this embodiment includes non-contact electrical power transmission apparatus 200 (hereinafter, referred to as an electrical power transmission apparatus) which transmits electrical power in a wireless manner and non-contact electrical power receiving apparatus 300 (hereinafter, referred to as electrical power receiving apparatus) which receives the transmitted electrical power. The electrical power is supplied from electrical power transmission apparatus 200 to electrical power receiving apparatus 300 in a non-contact manner.

Electrical power transmission apparatus 200 includes A/C power source 201, electrical power transmission antenna section 202, electrical power measurement section 203, and wireless communication section 204.

A/C power source 201 generates A/C voltage W1. A/C power source 201 outputs generated A/C voltage W1 to electrical power transmission antenna section 202 and electrical power measurement section 203. A/C power source 201 includes a power source which converts a D/C current input from a D/C power source to A/C by means of an oscillator or the like and outputs A/C, or the like.

If A/C voltage W1 output from A/C power source 201 is acquired, electrical power transmission antenna section 202 generates an electromagnetic field. Electrical power transmission antenna section 202 is formed to have, for example a coil shape.

Electrical power measurement section 203 measures A/C voltage W1 output from A/C power source 201 and a current flowing depending on A/C voltage W1, and outputs an electrical power value calculated from these values to wireless communication section 204 as transmission electrical power information.

Wireless communication section 204 transmits the transmission electrical power information to wireless communication section 303 of electrical power receiving apparatus 300 described below.

Electrical power receiving apparatus 300 includes electrical power receiving antenna section 301, electrical power measurement section 302, wireless communication section 303, electrical power supply efficiency calculation section 304, electrical power receiving antenna impedance measurement section 305, rectification section 306, impedance control section 307, charging apparatus group 310, and charging apparatus group impedance measurement section 314. Impedance control section 307 has selection section 308 and switching section 309. Charging apparatus group 310 has charging apparatuses 311, 312, and 313. Although a case where the number of charging apparatuses is three will be described, the claimed invention is not limited thereto, and the number of charging apparatuses may be at least two.

Electrical power receiving antenna section 301 electromagnetically resonates with the electromagnetic field generated by electrical power transmission antenna section 202 of electrical power transmission apparatus 200 to generate induction voltage (A/C voltage) W2. Accordingly, the electrical power is transmitted from electrical power transmission apparatus 200 to electrical power receiving apparatus 300 in a non-contact manner. Electrical power receiving antenna section 301 is formed to have, for example, a coil shape.

Electrical power measurement section 302 measures induction voltage W2 generated by electrical power receiving antenna section 301 and a current flowing depending on induction voltage W2, and outputs an electrical power value calculated from these values to electrical power supply efficiency calculation section 304 as received electrical power information.

Wireless communication section 303 receives the transmission electrical power information transmitted from electrical power transmission apparatus 200, and outputs the transmission electrical power information to electrical power supply efficiency calculation section 304.

Electrical power supply efficiency calculation section 304 acquires the transmission electrical power information from wireless communication section 303. Electrical power supply efficiency calculation section 304 acquires the received electrical power information from electrical power measurement section 302. Electrical power supply efficiency calculation section 304 calculates electrical power supply efficiency of non-contact electrical power transmission system 100 using these kinds of electrical power information. The electrical power supply efficiency is defined as electrical power supply efficiency=received electrical power/transmission electrical power. Electrical power supply efficiency calculation section 304 outputs information regarding the calculated electrical power supply efficiency to selection section 308 of impedance control section 307. When the transmission electrical power is constant, the electrical power supply efficiency may be calculated from the received electrical power and an arbitrary coefficient.

Electrical power receiving antenna impedance measurement section 305 measures impedance of electrical power receiving antenna section 301. Impedance of electrical power receiving antenna section 301 changes depending on the distance between electrical power transmission antenna section 202 of electrical power transmission apparatus 200 and electrical power receiving antenna section 301 of electrical power receiving apparatus 300 or space magnetic permeability. Accordingly, electrical power receiving antenna impedance measurement section 305 measures impedance of electrical power receiving antenna section 301 regularly. Electrical power receiving antenna impedance measurement section 305 stores the measured value of impedance of electrical power receiving antenna section 301 in an internal memory. Electrical power receiving antenna impedance measurement section 305 outputs the measured value of impedance of electrical power receiving antenna section 301 to selection section 308 as impedance information in response to a request from selection section 308 of impedance control section 307. The impedance information of electrical power receiving antenna section 301 is hereinafter referred to as electrical power receiving antenna impedance information.

If induction voltage W2 generated in electrical power receiving antenna section 301 is input, rectification section 306 converts induction voltage W2 to D/C voltage W3 which is appropriate for charging apparatus group 310. Rectification section 306 supplies D/C voltage W3 to switching section 309 of impedance control section 307.

Charging apparatuses 311, 312, and 313 charge DIC voltage W3 which is supplied from rectification section 306 through switching section 309. Charging apparatuses 311, 312, and 313 are, for example, secondary batteries (rechargeable batteries) or capacitors. Hereinafter, the simple term "charging apparatus" indicates one of charging apparatuses 311, 312, 313.

Switching section 309 switches a supply destination of D/C voltage W3 to one of charging apparatuses 311, 312, and 313 on the basis of a switching signal or a selection signal from selection section 308 described below.

If the switching signal is output from selection section 308 to switching section 309, charging apparatus group impedance measurement section 314 measures impedance of charging apparatus group 310. Impedance of charging apparatus group 310 changes depending on the residual amount of electrical power of charging apparatuses 311, 312, and 313.

Charging apparatus group impedance measurement section 314 stores the measured value of impedance of charging apparatus group 310 in the internal memory. Charging apparatus group impedance measurement section 314 outputs the measured value to selection section 308 as impedance information of charging apparatus group 310 in response to a request from selection section 308 of impedance control section 307. The impedance information of charging apparatus group 310 is hereinafter referred to as charging impedance information.

Selection section 308 first outputs the switching signal for designating one of charging apparatuses 311, 312, and 313 as candidate charging apparatuses for a supply destination, to which the electrical power will be supplied, to switching section 309 and charging apparatus group impedance measurement section 314. Selection section 308 acquires impedance information (charging impedance information) of charging apparatus group 310 for each candidate from charging apparatus group impedance measurement section 314. Selection section 308 selects a charging apparatus, to which DIC voltage W3 input from rectification section 306 will be actually supplied, from the candidates on the basis of the electrical power receiving antenna impedance information and the charging impedance information for each candidate. Selection section 308 outputs a selection signal for causing D/C voltage W3 to be supplied to the selected candidate (charging apparatus) to switching section 309.

In this embodiment, selection section 308 selects a charging apparatus, in which charging is performed, from charging apparatuses 311, 312, and 313 during charging, thereby switching impedance of charging apparatus group 310. In this way, electrical power receiving apparatus 300 of this embodiment switches impedance using the charging apparatuses which charge electrical power, thereby suppressing a decline in electrical power supply efficiency. For this reason, according to this embodiment, it is possible to perform charging efficiently in various circumstances while suppressing an increase in circuit scale.

Selection section 308 has an internal memory. Selection section 308 records the electrical power supply efficiency, the charging impedance information, and management information representing information (apparatus ID or the like) of each charging apparatus in charging apparatus group 310 in the internal memory. Selection section 308 selects an optimum charging apparatus, to which D/C voltage W3 will be actually supplied, using these kinds of information. The method of selecting an optimum charging apparatus will be described below.

Next, the operation of impedance control section 307 will be described with reference to FIG. 2.

Figure 2:
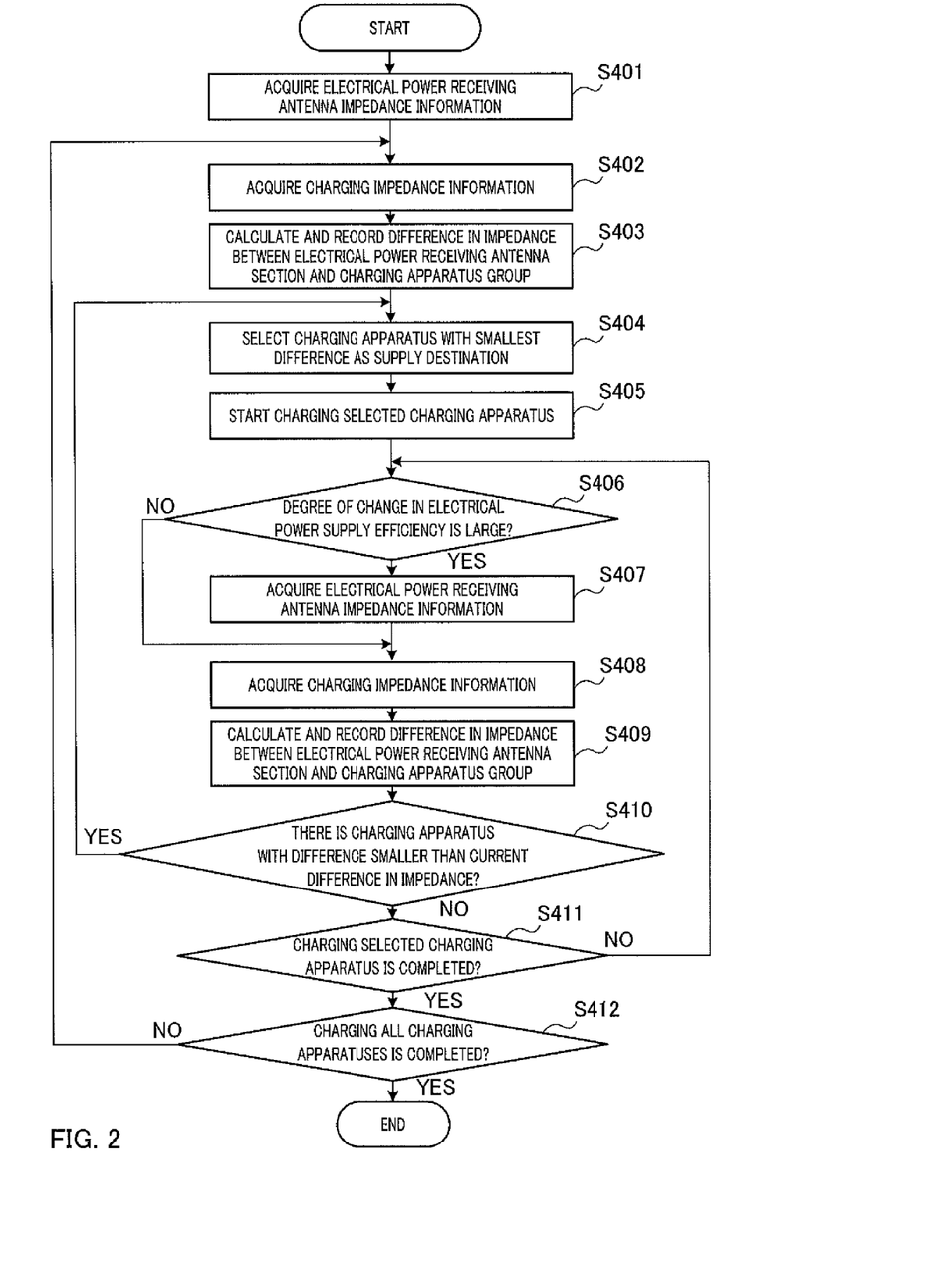
FIG. 2 is a diagram showing an example of an impedance control and charging processing flow of an impedance control section in Embodiment 1.

FIG. 2 is a diagram showing a processing flow in which impedance control section 307 performs charging while switching the charging apparatuses of charging apparatus group 310.

Selection section 308 acquires the impedance information (electrical power receiving antenna impedance information) of electrical power receiving antenna section 301 from electrical power receiving antenna impedance measurement section 305 (Step S401).

Next, selection section 308 acquires, from charging apparatus group impedance measurement section 314, the impedance information (charging impedance information) of charging apparatus group 310 when each candidate (charging apparatus) charges D/C voltage W3 (Step S402).

Figure 3A:
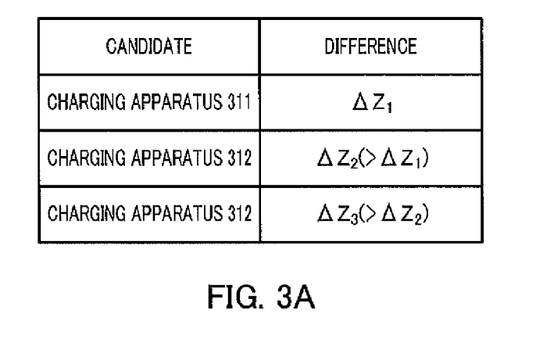
FIG. 3A is a diagram showing a difference which is recorded in an internal memory.

Selection section 308 calculates the difference between impedance of charging apparatus group 310 for each candidate (charging apparatus) and impedance of electrical power receiving antenna section 301, and records the difference in the internal memory (Step S403). FIG. 3A shows an example of the difference which is recorded in the internal memory by selection section 308. As shown in FIG. 3A, the difference between impedance of charging apparatus group 310 and impedance of electrical power receiving antenna section 301 is recorded in association with each candidate (charging apparatus).

Selection section 308 selects a candidate (charging apparatus) with the smallest difference between impedance of charging apparatus group 310 and impedance of electrical power receiving antenna section 301 as a charging apparatus for a supply (charging) destination with reference to the internal memory (Step S404).

FIG. 3A shows an example where the difference between impedance of charging apparatus group 310 for each of charging apparatuses 311, 312, and 313 as a supply destination and impedance of electrical power receiving antenna section 301 is $\Delta Z1$, $\Delta Z2$ ($>\Delta Z1$), and $\Delta Z3$ ($>\Delta Z2$). In this case, since $\Delta Z1$ is smallest, selection section 308 selects charging apparatus 311 as a charging apparatus for a supply destination.

Selection section 308 outputs a selection signal to switching section 309 such that D/C voltage W3 is supplied to the selected charging apparatus, and charging the charging apparatus selected as a supply destination starts (Step S405).

Next, selection section 308 determines whether or not the degree of change in electrical power supply efficiency is large (Step S406).

In regard to a tendency to change electrical power supply efficiency, the following two cases are considered.

(Case 1)

While charging is performed, the residual amount of electrical power of a charging apparatus changes, resulting in change in impedance of charging apparatus group 310. Change in impedance of charging apparatus group 310 causes gradual change in electrical power supply efficiency.

(Case 2)

The distance or direction between electrical power transmission antenna section 202 and electrical power receiving antenna section 301 changes, or space magnetic permeability changes due to obstacles, resulting in change in impedance of electrical power receiving antenna section 301. Change in impedance of electrical power receiving antenna section 301 causes change in electrical power supply efficiency.

While in Case 1, the electrical power supply efficiency changes gradually, in Case 2, the electrical power supply efficiency changes rapidly compared to Case 1.

Accordingly, in Step S406, selection section 308 compares the value of newly acquired electrical power supply efficiency with the value of electrical power supply efficiency which is notified of from electrical power supply efficiency calculation section 304 and stored in the internal memory to determines the degree of change in electrical power supply efficiency. Specifically, when these values of electrical power supply efficiency are different extremely, selection section 308 determines that the degree of change in electrical power supply efficiency is large (Step S406: YES).

When the degree of change in electrical power supply efficiency is large (Step S406: YES), it is regarded that the distance or direction between electrical power transmission antenna section 202 and electrical power receiving antenna section 301 changes, or space magnetic permeability changes due to obstacles. That is, in this case, it is regarded that change in impedance of electrical power receiving antenna section 301 causes change in electrical power supply efficiency. In this ease, a message which requests stopping electrical power supply, avoiding obstacles, or correcting change in the distance or direction between the antennas may also be output.

Accordingly, selection section 308 acquires the impedance information of electrical power receiving antenna section 301 from electrical power receiving antenna impedance measurement section 305 (Step S407).

In Step S406, when the degree of change in electrical power supply efficiency is small (Step S406: NO), selection section 308 skips Step S407 and progresses to Step S408. That is, when electrical power supply efficiency changes due to the reason of Case 1, the determination of Step S406 allows the processing of Step S407 to be skipped. For this reason, it is possible to reduce the processing amount and to reduce the time until the electrical power reception of all charging apparatuses is completed.

In Step S408, as in Step S402, selection section 308 acquires the impedance information (charging impedance information) of charging apparatus group 310.

As in Step S403, selection section 308 calculates the difference between impedance of the charging impedance information and impedance of electrical power receiving antenna section 301, and records the difference in the internal memory (Step S409).

Selection section 308 determines, on the basis of the difference, whether or not there is a charging apparatus with a smaller difference than a case of continuously charging a charging apparatus in which charging is currently being performed (Step S410). That is, selection section 308 determines whether or not there is a charging apparatus for a charging destination with the highest electrical power supply efficiency.

When there is the relevant charging apparatus (Step S410: YES), in order to switch a charging apparatus for charging (supply destination), selection section 308 returns to the processing of Step S404. When no relevant charging apparatus is found (Step S410: NO), selection section 308 progresses to Step S411.

In Step S411, selection section 308 determines whether or not charging a charging apparatus in which charging is currently being performed is completed. This determination is made according to, for example, whether or not the amount of current flowing into the charging apparatus is equal to or smaller than a given value. Specifically, when the amount of current flowing into the charging apparatus is equal to or smaller than the given value, selection section 308 determines that charging the charging apparatus is completed. Hereinafter, when the amount of current flowing into the charging apparatus is equal to or smaller than the given value, this is described as "charging is completed".

When charging is not completed (Step S411: NO), selection section 308 returns to the determination processing of Step S406. When charging is completed (Step S411: YES), selection section 308 progresses to Step S412.

In Step S412, as in Step S411, selection section 308 determines whether or not charging all charging apparatuses is completed. When charging all charging apparatuses is completed (Step S412: YES), selection section 308 ends impedance control and charging processing in selection section 308. When charging all charging apparatuses is not completed (Step S412: NO), selection section 308 returns to the processing of Step S402, and continuously performs impedance control and charging processing until charging all charging apparatuses is completed.

Figure 4:
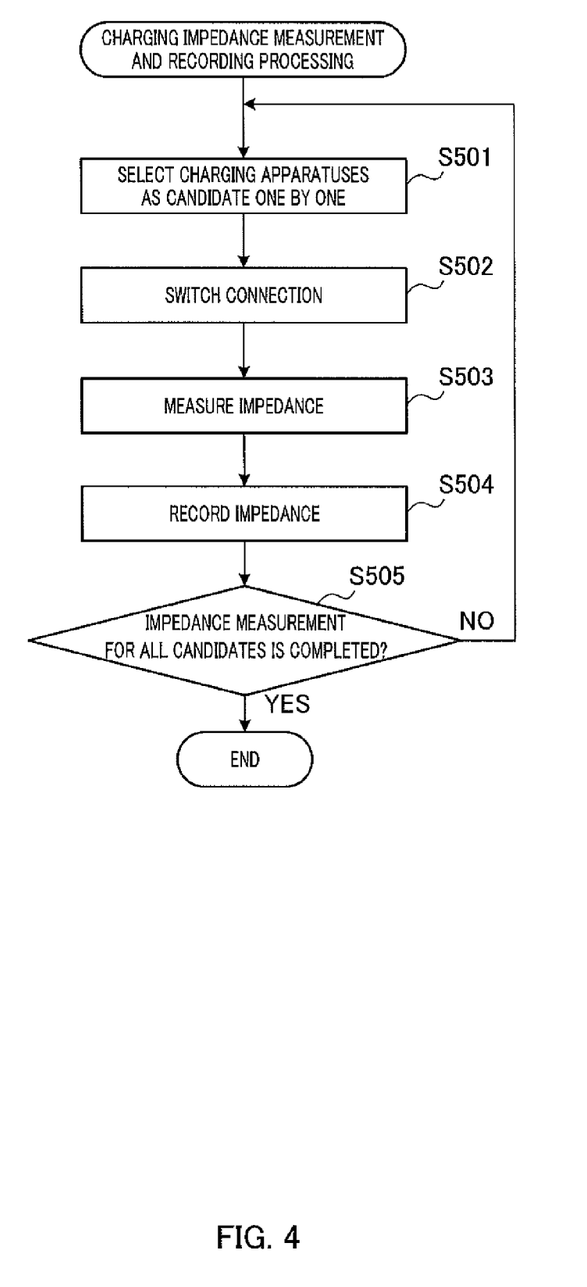
FIG. 4 is a diagram showing an example of a measurement and recording processing flow of charging impedance.

FIG. 4 is a diagram showing a processing flow in which charging apparatus group impedance measurement section 314 measures impedance of charging apparatus group 310, and records the charging impedance information inside.

Selection section 308 selects each charging apparatus from the charging apparatuses in charging apparatus group 310 as a candidate charging apparatus for charging one by one with reference to the management information recorded in the internal memory (Step S501).

Figure 3B:
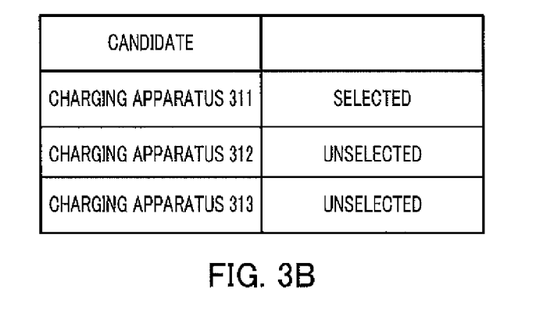
FIG. 3B is a diagram showing management information.

FIG. 3B shows an example of the management information. The management information of FIG. 3B has information representing, with charging apparatuses 311, 312, and 313 in charging apparatus group 310, whether or not these charging apparatuses are selected as candidates. If the charging apparatuses as candidates are different, impedance of charging apparatus group 310 differs.

Selection section 308 outputs the switching signal to switching section 309 such that D/C voltage W3 generated by rectification section 306 is input to only the charging apparatuses selected as candidates, and switches circuit connection (Step S502).

If the switching signal is output from selection section 308 to switching section 309, charging apparatus group impedance measurement section 314 measures impedance of charging apparatus group 310 for each candidate (Step S503).

Figure 3C:
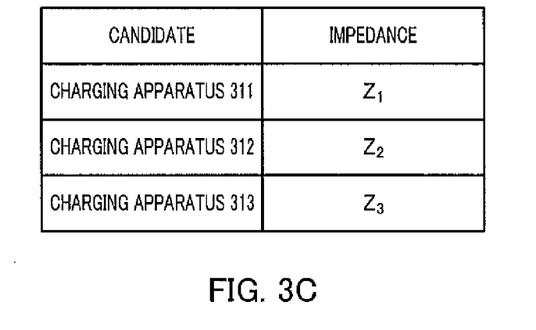
FIG. 3C is a diagram showing an example of charging impedance information.

Charging apparatus group impedance measurement section 314 records the measured value in the internal memory for each candidate as charging impedance information (Step S504). FIG. 3C shows an example of the charging impedance information.

Next, selection section 308 determines whether or not impedance measurement is completed for all candidates (charging apparatuses) (Step S505).

Selection section 308 refers to the management information recorded in the internal memory, and when impedance measurement is not completed for all candidates (Step S505: NO), returns to the processing of Step S501. When impedance measurement is completed for all candidates (Step S505: YES), selection section 308 completes the processing.

As described above, in electrical power receiving apparatus 300 of this embodiment, impedance control section 307 sequentially switches one of a plurality of charging apparatuses in charging apparatus group 310 as a candidate charging apparatus for a supply destination to which electrical power will be supplied. Impedance control section 307 selects a charging apparatus, to which the electrical power will be actually supplied, from the candidates on the basis of the difference between impedance of charging apparatus group 310 for each candidate and impedance of electrical power receiving antenna section 301. Impedance control section 307 supplies the electrical power to the selected charging apparatus. At this time, impedance control section 307 preferentially selects a candidate with a small difference between impedance of charging apparatus group 310 for each candidate and impedance of electrical power receiving antenna section 301 as a charging apparatus to which the electrical power will be actually supplied. Accordingly, in this embodiment, a charging apparatus with the most matching of impedance of charging apparatus group 310 and impedance of electrical power receiving antenna section 301 is preferentially selected as a charging apparatus for a supply destination. In this embodiment, charging is preferentially performed from a charging apparatus with high electrical power supply efficiency. In this embodiment, since impedance is switched using the charging apparatuses which charge the electrical power generated in electrical power receiving antenna section 301, it is possible to suppress a decline in electrical power supply efficiency in various circumstances while suppressing an increase in circuit scale. As a result, in this embodiment, it is possible to supply the electrical power generated in electrical power receiving antenna section 301 to the charging apparatuses with high efficiency, and to reduce the time of charging the charging apparatuses.

(Embodiment 2)

In Embodiment 1, a case where one of a plurality of charging apparatuses in the charging apparatus group becomes a candidate for an electrical power supply destination has been described. In this embodiment, a case where a combination of a plurality of charging apparatuses in the charging apparatus group becomes a candidate for an electrical power supply destination will be described.

Figure 5:
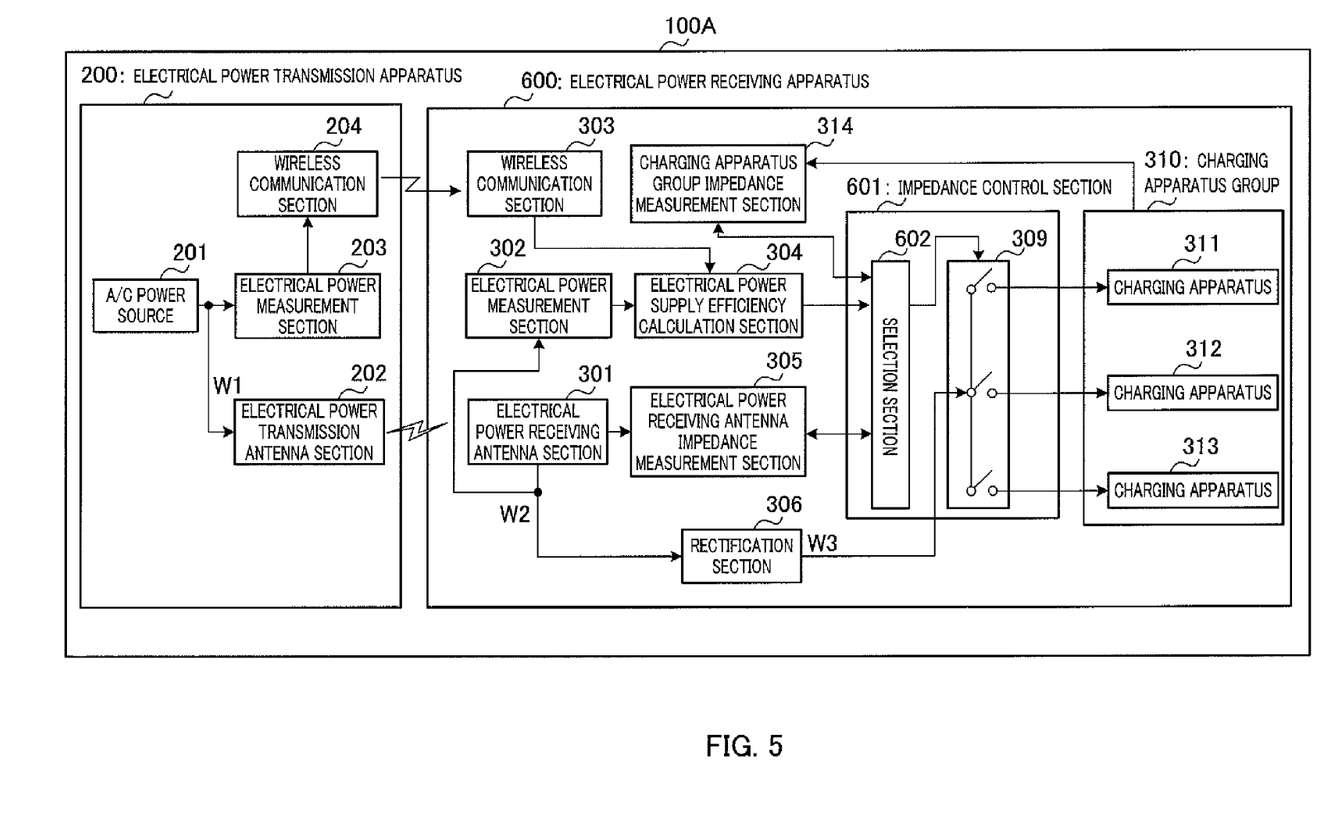
FIG. 5 is a diagram showing the configuration of a non-contact electrical power transmission system according to Embodiment 2 of the claimed invention.

FIG. 5 shows the configuration of a non-contact electrical power transmission system according to Embodiment 2 of the claimed invention. In FIG. 5, constituent portions common to FIG. 1 are represented by the same reference numerals as in FIG. 1, and description thereof will not be repeated. Non-contact electrical power transmission system 100A of FIG. 5 has electrical power receiving apparatus 600 instead of electrical power receiving apparatus 300.

Electrical power receiving apparatus 600 of FIG. 5 has impedance control section 601 instead of impedance control section 307 of electrical power receiving apparatus 300 of FIG. 1. Impedance control section 601 has selection section 602 and switching section 309.

Next, the operation of impedance control section 601 will be described. A processing flow in which impedance control section 601 performs charging while controlling impedance of charging apparatus group 310 is the same as in FIG. 2. However, a processing flow of Step S402 differs between impedance control section 307 and impedance control section 601. Accordingly, the processing flow of Step S402 in impedance control section 601 will be hereinafter described.

Figure 6:
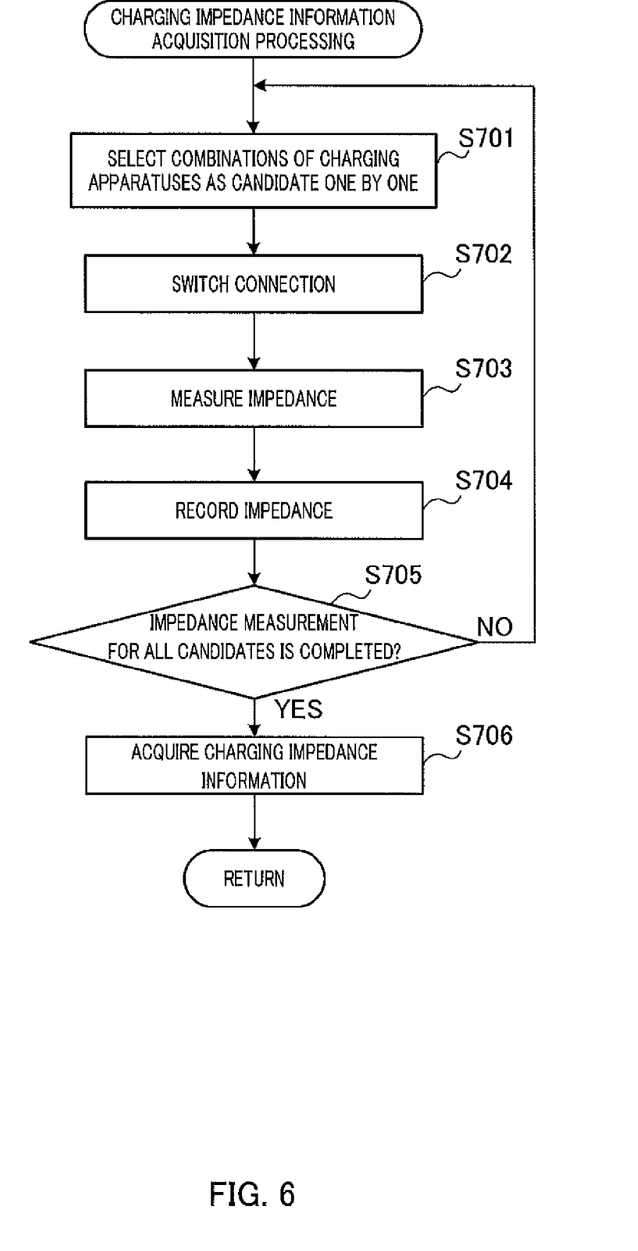
FIG. 6 is a diagram showing an example of a charging impedance information acquisition processing flow of an impedance control section.

FIG. 6 is a diagram showing a processing flow in which impedance control section 601 acquires impedance information (charging impedance information) of charging apparatus group 310.

Selection section 602 selects, one by one, combinations of charging apparatuses for charging as candidate charging apparatuses for a supply destination, to which electrical power will be supplied, from the charging apparatuses in charging apparatus group 310 as candidate charging apparatuses for charging (Step S701). At this time, selection section 602 selects candidate charging apparatuses for a supply destination, to which electrical power will be supplied, with reference to management information recorded in the internal memory.

Figure 7A:
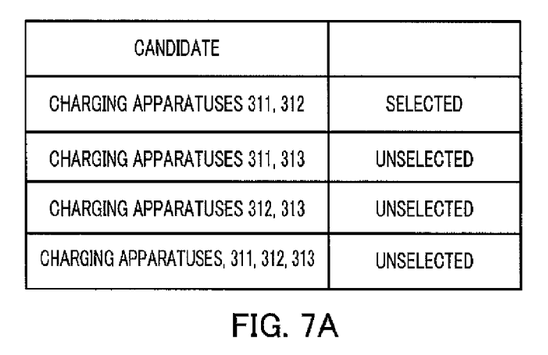
FIG. 7A is a diagram showing management information.

FIG. 7A shows an example of the management information. The management information of FIG. 7A has information representing, with the combinations of charging apparatuses 311, 312, and 313 in charging apparatus group 310, whether or not these combinations are selected as candidates. If the combinations of charging apparatuses as candidates are different, impedance of charging apparatus group 310 differs.

Although in Embodiment 1, the charging apparatuses are selected as candidates for an electrical power supply destination one by one, in this embodiment, the combinations of charging apparatuses are selected as candidates one by one.

Selection section 602 outputs the switching signal to switching section 309 such that DIC voltage W3 generated by rectification section 306 is input to only the charging apparatuses constituting the combinations selected as candidates, and switches circuit connection (Step S702).

Charging apparatus group impedance measurement section 314 measures impedance of charging apparatus group 310 for each candidate (Step S703).

Figure 7B:
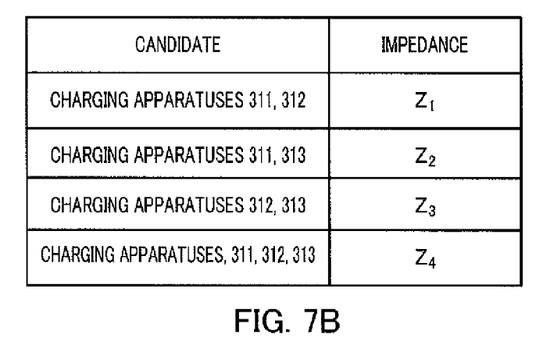
FIG. 7B is a diagram showing charging impedance information.

Charging apparatus group impedance measurement section 314 records the measured value in the internal memory for each candidate as charging impedance information (Step S704). FIG. 7B is a diagram showing an example of the charging impedance information.

Next, selection section 602 determines whether or not impedance measurement is completed for all candidates (combinations of charging apparatuses) (Step S705).

Selection section 602 refers to the management information recorded in the internal memory, and when impedance measurement is not completed for all candidates (Step S705: NO), returns to the processing of Step S701. When impedance measurement is completed for all candidates (Step S705: YES), selection section 602 progresses to Step S706.

Selection section 602 acquires the charging impedance information recorded in the internal memory of charging apparatus group impedance measurement section 314 (Step S706). If the charging impedance information is acquired in this way, selection section 602 progresses to Step S403 of FIG. 2.

Figure 7C:
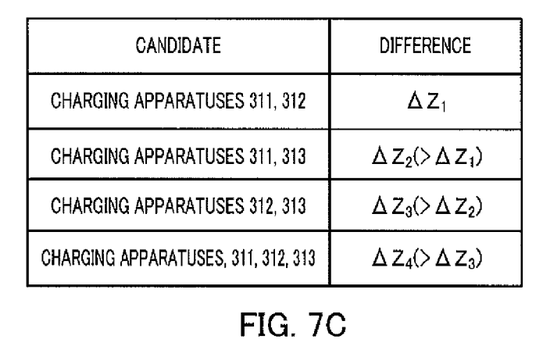
FIG. 7C is a diagram showing an example of a difference which is recorded in an internal memory.

FIG. 7C shows an example of the difference which is recorded in the internal memory by selection section 602 in Step S403. As shown in FIG. 7C, the difference between impedance of charging apparatus group 310 and impedance of electrical power receiving antenna section 301 is recorded in association with each candidate (charging apparatus).

Subsequently, as in electrical power receiving apparatus 300, electrical power receiving apparatus 600 progresses to Step S404 of FIG. 2.

As described above, in electrical power receiving apparatus 600 of this embodiment, impedance control section 601 sequentially switches one of the combinations of a plurality of charging apparatuses in charging apparatus group 310 as candidate charging apparatuses for a supply destination to which the electrical power will be supplied. Impedance control section 601 selects a charging apparatus, to which the electrical power will be actually supplied, from the candidates on the basis of the difference between impedance of charging apparatus group 310 for each candidate and impedance of electrical power receiving antenna section 301. Impedance control section 601 causes the electrical power to be supplied to the selected charging apparatus. At this time, impedance control section 601 preferentially selects a candidate with a small difference between impedance of charging apparatus group 310 for each candidate and impedance of electrical power receiving antenna section 301 as a charging apparatus to which the electrical power will be actually supplied. Accordingly, in this embodiment, a charging apparatus with the most matching of impedance of charging apparatus group 310 and impedance of electrical power receiving antenna section 301 is preferentially selected as a charging apparatus for a supply destination. In this embodiment, charging is performed preferentially from a charging apparatus with high electrical power supply efficiency. In this embodiment, it is possible to switch impedance using the charging apparatuses which charge the electrical power generated in electrical power receiving antenna section 301. For this reason, in this embodiment, it is possible to suppress a decline in electrical power supply efficiency in various circumstances while suppressing an increase in circuit scale. As a result, in this embodiment, it is possible to supply the electrical power generated in electrical power receiving antenna section 301 to the charging apparatuses with high efficiency, and to reduce the time of charging the charging apparatuses.

(Embodiment 3)

In Embodiments 1 and 2, a case where the charging apparatus group is not connected to a load has been described. In this embodiment, a case where the charging apparatus group is connected to a load will be described.

In this embodiment, each of charging apparatuses 311, 312, and 313 constituting charging apparatus group 310 has three terminals for load, impedance measurement, and electrical power supply. The terminals for load and impedance measurement may be commonly used. Each charging apparatus is connected to a load. One of the three charging apparatuses is selected and used for the load. The three charging apparatuses are used in parallel to the load. If the residual amount of electrical power of a charging apparatus which supplies the electrical power decreases, charging apparatus group 310 has a function of switching the charging apparatus which supplies the electrical power.

A processing flow in which impedance control section 307 or impedance control section 601 performs charging while controlling impedance of charging apparatus group 310 is the same as in FIG. 2.

As described above, in this embodiment, impedance measurement is performed in a state where the charging apparatuses constituting charging apparatus group 310 are connected to the load. Accordingly, in this embodiment, the load which uses the electrical power charged in the charging apparatuses of electrical power receiving apparatus 300 or electrical power receiving apparatus 600 is connected. In this state, in this embodiment, a charging apparatus with the most matching of impedance of charging apparatus group 310 and impedance of electrical power receiving antenna section 301 is preferentially selected as a charging apparatus for a supply destination. In this embodiment, charging is preferentially performed from a charging apparatus with high electrical power supply efficiency. In this embodiment, it is possible to switch impedance using the charging apparatuses which charge the electrical power generated in electrical power receiving antenna section 301. For this reason, in this embodiment, it is possible to suppress a decline in electrical power supply efficiency in various circumstances while suppressing an increase in circuit scale. As a result, in this embodiment, it is possible to supply the electrical power generated by electrical power receiving antenna section 301 to the charging apparatuses with high efficiency, and to reduce the time of charging the charging apparatuses.

In the above description, a case where the impedance control section has the selection section and the switching section has been described. However, the impedance control section may have the functions of the selection section and the switching section.

In combination of Embodiments 1 and 2, the impedance control section may select the charging apparatus one by one or may select the combination of the charging apparatuses one by one as a candidate for an electrical power supply destination. Accordingly, since the number of possible values of impedance of the charging apparatus group increases, the electrical power receiving apparatus can perform flexible impedance control, and can easily obtain impedance matching.

In the above description, in Step S406 of FIG. 2, impedance control section 307 acquires the impedance information of the electrical power receiving antenna in a case of a large degree of change in electrical power supply efficiency as a trigger (activation event or activation timing). That is, impedance control section 307 determines the timing of acquiring impedance of electrical power receiving antenna section 301 from electrical power receiving antenna impedance measurement section 305 on the basis of the degree of change in electrical power supply efficiency. However, the method of determining a trigger (activation event or activation timing) is not limited thereto. For example, impedance control section 307 may simply set a decline in the amount of received electrical power as a trigger (activation event or activation timing) instead of electrical power supply efficiency. That is, impedance control section 307 may determine the timing of acquiring impedance of electrical power receiving antenna section 301 from electrical power receiving antenna impedance measurement section 305 on the basis of the degree of change in electrical power. In this case, the electrical power transmission apparatus does not require the electrical power measurement section and the wireless communication section. The electrical power receiving apparatus may omit the wireless communication section, and may includes an electrical power measurement section which measures the amount of received electrical power, instead of the electrical power supply efficiency calculation section.

Impedance control section 307 may skip the processing in Step S406 of FIG. 2. Accordingly, impedance control section 307 may acquire impedance of electrical power receiving antenna section 301 from electrical power receiving antenna impedance measurement section 305 constantly, periodically, at a random time interval, or at an arbitrary time interval. In this case, the electrical power transmission apparatus does not require the electrical power measurement section and the wireless communication section. The electrical power receiving apparatus does not require the wireless communication section and the electrical power supply efficiency calculation section.

In the electrical power receiving apparatus, the charging apparatuses may be constituted by only secondary batteries. Accordingly, the claimed invention can be easily applied to general instrument which uses a secondary battery.

In the electrical power receiving apparatus, the charging apparatuses may be constituted by secondary batteries and capacitors. Since a capacitor is lightweight compared to a secondary battery, capacitors can be used along with secondary batteries as a plurality of charging apparatuses to thereby reduce the weight of the electrical power receiving apparatus.

In the electrical power receiving apparatus, the charging apparatuses may be constituted by a plurality of capacitors and secondary batteries connected to the plurality of capacitors. A capacitor can be charged in a short time compared to a secondary battery. For this reason, in the electrical power receiving apparatus, if all the electrical power which is supplied from the electrical power receiving antenna section is temporarily charged in the capacitors, and thereafter, the capacitors are discharged to charge the secondary batteries, it is possible to reduce the time necessary for charging.

Although in the above description, an example case where the charging apparatus group has the three charging apparatuses (charging apparatuses 311, 312, and 313) has been described, the claimed invention is not limited thereto. The claimed invention can be applied to a case where the charging apparatus group has four or more charging apparatuses.

Each functional block of the electrical power supply efficiency calculation section, the electrical power receiving antenna impedance measurement section, the impedance control section, the charging apparatus impedance measurement section, or the like may be typically implemented by an integrated circuit or LSI (Large Scale Integration). These may be individual chips, or a part or all of them may be included in a single chip. The term "LSI" may also be referred to as "IC", "system LSI", "super LSI", or "ultra LSI" due to the difference in integration.

The method of circuit integration is not limited to LSI, and circuit integration may be implemented by dedicated circuits or general-purpose processors. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2011-050582, filed on Mar. 8, 2011, including the specification, drawings and abstract, is incorporated herein by reference in its entirety.

Industrial Applicability

The electrical power receiving apparatus and the electrical power receiving method according to the claimed invention are effective as a battery driving apparatus or the like to which electrical power can be supplied from a transmission apparatus provided in a vehicle, a facility, an electrical power supply stand, or the like. The electrical power receiving apparatus and the electrical power receiving method according to the claimed invention can be applied to the purposes of equipment which is operated with a battery, such as portable equipment and a personal computer, the portable equipment including, for example, a portable music player, a tablet, a smart phone, and an e-book reader.

REFERENCE SIGNS LIST 100, 100A Non-contact electrical power transmission system
200 Electrical power transmission apparatus
201 A/C power source
202 Electrical power transmission antenna section
203 Electrical power measurement section
204 Wireless communication section
300, 600 Electrical power receiving apparatus
301 Electrical power receiving antenna section
302 Electrical power measurement section
303 Wireless communication section
304 Electrical power supply efficiency calculation section
305 Electrical power receiving antenna impedance measurement section
306 Rectification section
307, 601 Impedance control section
308, 602 Selection section
309 Switching section
310 Charging apparatus group
311, 312, 313 Charging apparatus
314 Charging apparatus group impedance measurement sectionf

The invention claimed is:

1. An electrical power receiving apparatus comprising:
an electrical power receiving antenna section that receives electrical power;
a first impedance measurement section that measures impedance of the electrical power receiving antenna section;
a charging apparatus group that has a plurality of charging apparatuses and accumulates the electrical power;
a second impedance measurement section that measures impedance of the charging apparatus group; and
a control section that sequentially switches at least one of the plurality of charging apparatuses as candidates for the charging apparatuses as a supply destination to which the electrical power will be supplied, selects the charging apparatus, to which the electrical power will be actually supplied, from the candidates on the basis of the difference between impedance of the charging apparatus group for each candidate and impedance of the electrical power receiving antenna section, and causes the electrical power to be supplied to the selected charging apparatus.

2. The electrical power receiving apparatus according to claim 1, wherein:
the control section preferentially selects the candidate with a small difference between impedance of the charging apparatus group and impedance of the electrical power receiving antenna section as the charging apparatus to which the electrical power will be actually supplied.

3. The electrical power receiving apparatus according to claim 1, wherein:
the control section sets each of the plurality of charging apparatuses as the candidate.

4. The electrical power receiving apparatus according to claim 1, wherein:
the control section sets the combination of the plurality of charging apparatuses as the candidate.

5. The electrical power receiving apparatus according to claim 1, wherein:
the control section sets each or the combination of the plurality of charging apparatuses as the candidate.

6. The electrical power receiving apparatus according to claim 1, further comprising:
a communication section that acquires information regarding transmission electrical power; and
a calculation section that calculates electrical power supply efficiency using the electrical power and the transmission electrical power, wherein the control section determines the timing of acquiring impedance of the electrical power receiving antenna section from the first impedance measurement section on the basis of the degree of change in the electrical power supply efficiency.

7. The electrical power receiving apparatus according to claim 1, further comprising:
a measurement section that measures the electrical power,
wherein the control section determines the timing of acquiring impedance of the electrical power receiving antenna section from the first impedance measurement section on the basis of the degree of change in the electrical power.

8. An electrical power receiving method comprising:
receiving electrical power;
measuring impedance of an electrical power receiving antenna section that receives the electrical power;
measuring impedance of a charging apparatus group that has a plurality of charging apparatuses and accumulates the electrical power;
sequentially switching at least one of the plurality of charging apparatuses as candidates for the charging apparatuses as a supply destination to which the electrical power will be supplied;
selecting the charging apparatus, to which the electrical power will be actually supplied, from the candidates on the basis of the difference between impedance of the charging apparatus group for each candidate and impedance of the electrical power receiving antenna section; and
causing the electrical power to be supplied to the selected charging apparatus.

* * * * *